(12) United States Patent
Siemens et al.

(10) Patent No.: US 10,190,653 B2
(45) Date of Patent: Jan. 29, 2019

(54) VIBRATION ABSORBER SYSTEM

(71) Applicant: ZF FRIEDRICHSHAFEN AG, Friedrichshafen (DE)

(72) Inventors: Kyrill Siemens, Würzburg (DE); Jörg Sudau, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 268 days.

(21) Appl. No.: 14/915,125

(22) PCT Filed: Jul. 29, 2014

(86) PCT No.: PCT/EP2014/066300
§ 371 (c)(1),
(2) Date: Feb. 26, 2016

(87) PCT Pub. No.: WO2015/028234
PCT Pub. Date: Mar. 5, 2015

(65) Prior Publication Data
US 2016/0208886 A1    Jul. 21, 2016

(30) Foreign Application Priority Data

Aug. 28, 2013  (DE) .................. 10 2013 217 089

(51) Int. Cl.
*F16F 15/14*  (2006.01)
*F16H 45/02*  (2006.01)

(52) U.S. Cl.
CPC .......... *F16F 15/145* (2013.01); *F16H 45/02* (2013.01); *F16H 2045/0226* (2013.01); *F16H 2045/0263* (2013.01)

(58) Field of Classification Search
CPC ...... F16F 15/14; F16F 15/1407; F16F 15/145; F16H 45/02; F16H 2045/0226; F16H 2045/0263
See application file for complete search history.

(56) References Cited

U.S. PATENT DOCUMENTS 6,382,050 B1 * 5/2002 Carlson ................. F16F 15/145
  464/24
9,133,905 B2 * 9/2015 Schierling ............. F16F 15/145
(Continued)

FOREIGN PATENT DOCUMENTS

DE    10 2009 042 818        5/2010
DE       102009042804 A1 *  6/2010  ............ F16F 15/145
(Continued)

*Primary Examiner* — Adam D Rogers
(74) *Attorney, Agent, or Firm* — Cozen O'Connor

(57) ABSTRACT

A mass damper system is provided with a damper mass carrier with at least one damper mass movable relative to the damper mass carrier and at least one stop. The damper mass moves within a predetermined movement region when a rotational movement of the damper mass carrier exceeds a predetermined limit speed. The predetermined movement region has a first movement region portion bounded at one end by an initial position in which the damper mass is free from a deflection in circumferential direction and by a limit position in which the damper mass has undergone a deflection, and a second movement region portion is defined at one end by the limit position and at the other end by a stop position in which the damper mass has come in contact with the stop.

11 Claims, 8 Drawing Sheets

(56) References Cited

U.S. PATENT DOCUMENTS

| | | | |
|---|---|---|---|
| 9,638,283 B2 * | 5/2017 | Wirachowski | F16F 15/145 |
| 9,726,254 B2 * | 8/2017 | Siemens | F16F 7/10 |
| 2015/0285332 A1 * | 10/2015 | Kram | F16F 15/145 74/574.2 |
| 2016/0033003 A1 * | 2/2016 | Siemens | F16F 7/108 188/379 |
| 2016/0208887 A1 * | 7/2016 | Kram | F16F 15/145 |
| 2016/0273614 A1 * | 9/2016 | Wirachowski | F16F 15/145 |
| 2017/0219048 A1 * | 8/2017 | Hertel | F16F 15/08 |

FOREIGN PATENT DOCUMENTS

| | | | |
|---|---|---|---|
| DE | 102010049930 A1 * | 5/2011 | F16F 15/145 |
| DE | 10 2010 029464 | 12/2011 | |
| DE | 10 2011 100895 | 12/2011 | |
| DE | 102010029464 A1 * | 12/2011 | F16F 15/145 |
| DE | 10 2011 086436 | 6/2012 | |
| EP | 2 607 743 | 6/2013 | |
| FR | 2 986 591 | 8/2013 | |
| WO | WO 2013/117840 | 8/2013 | |

\* cited by examiner

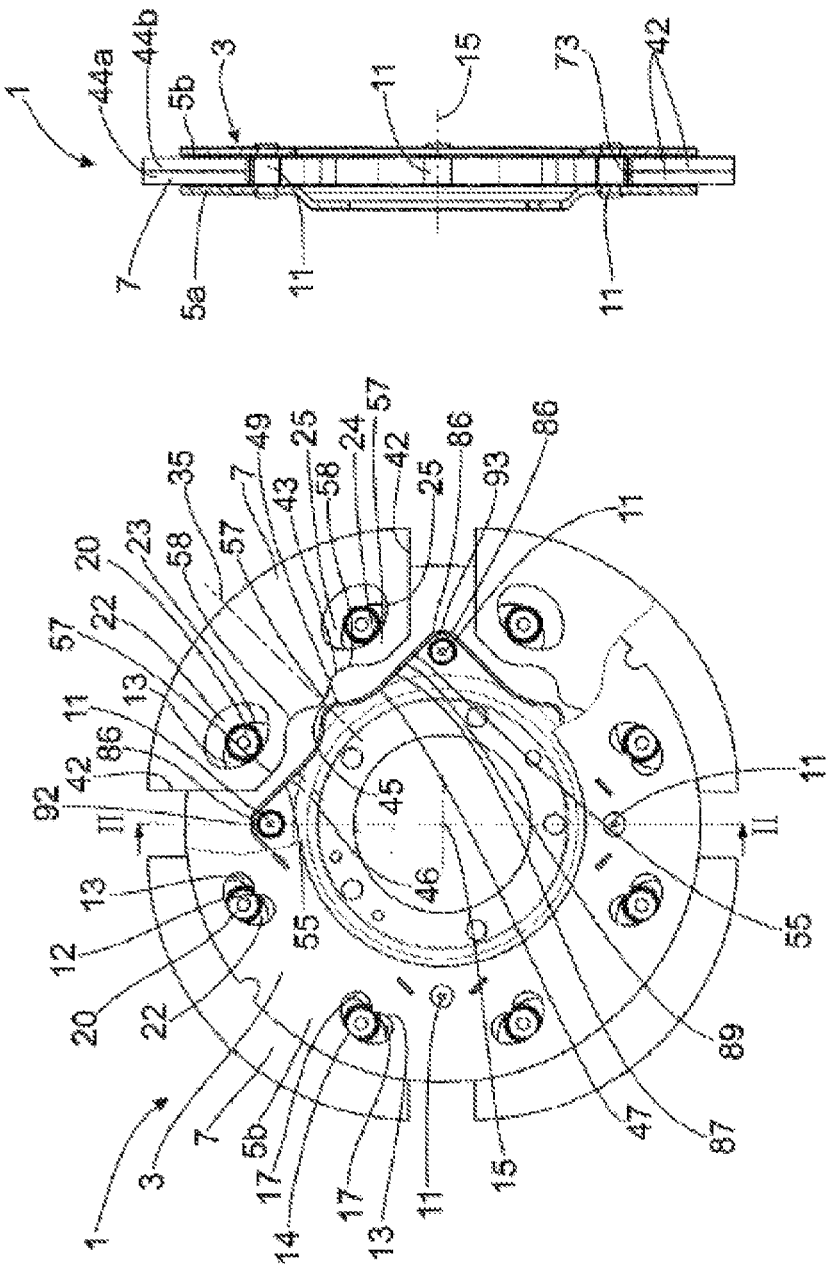

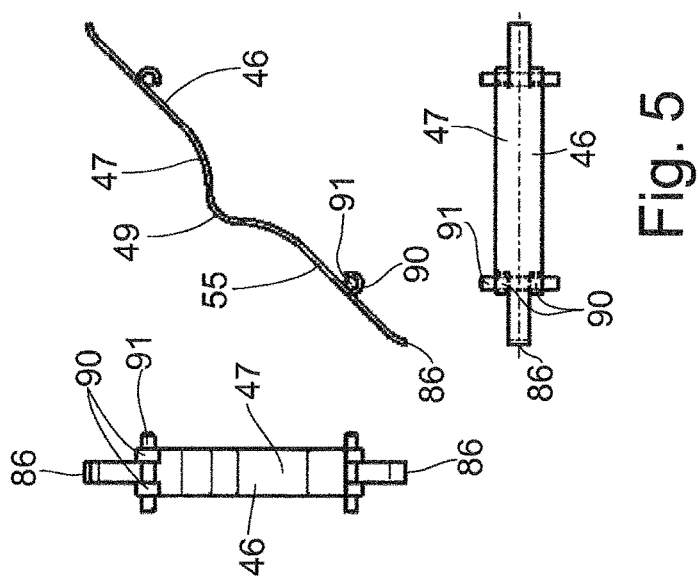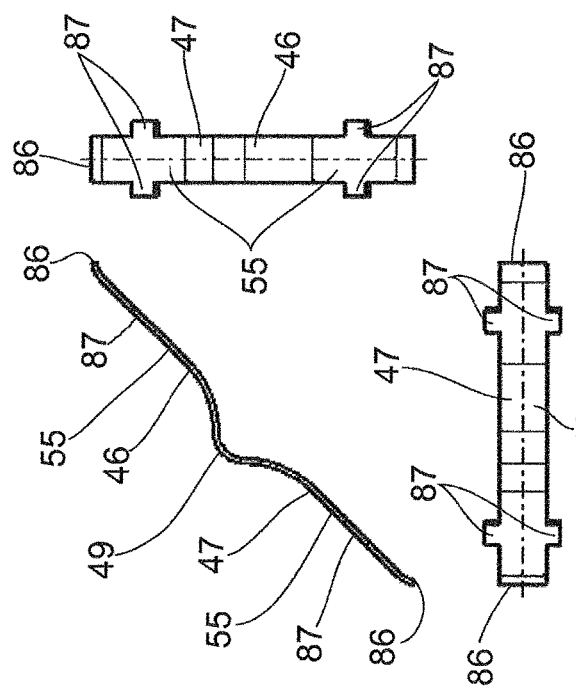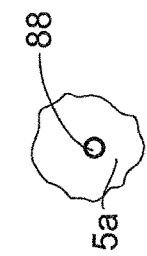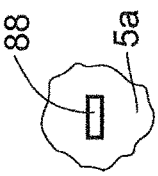

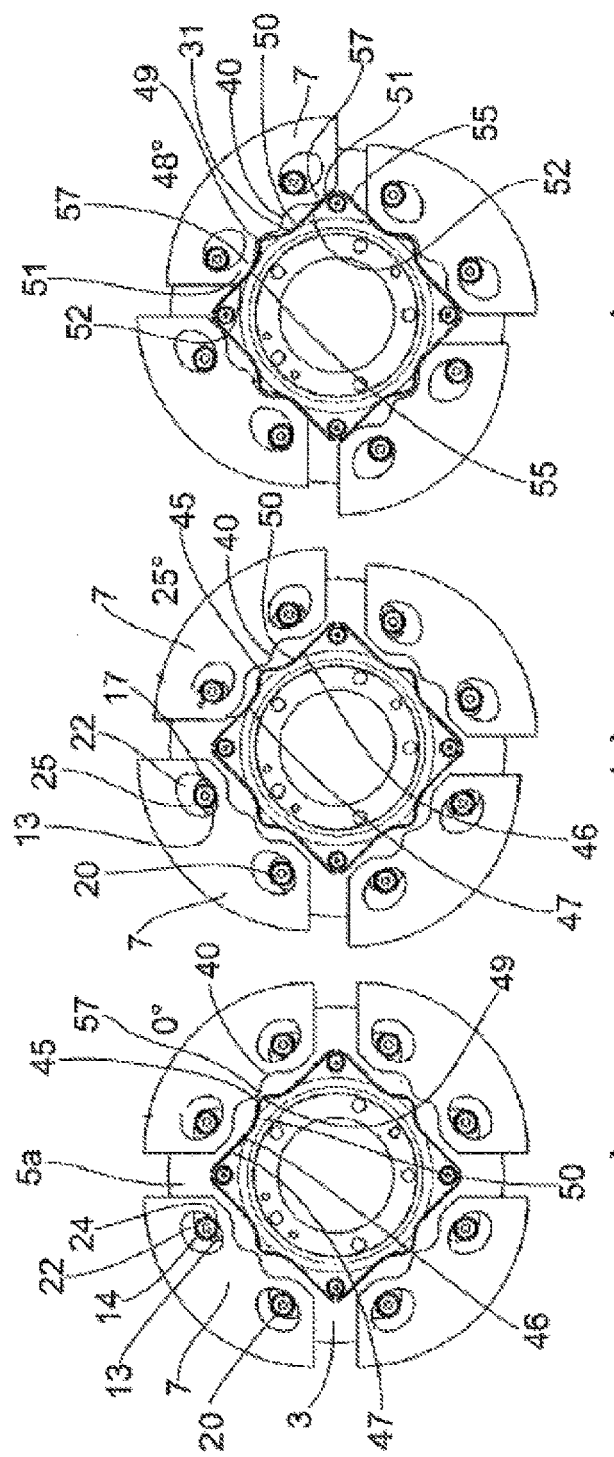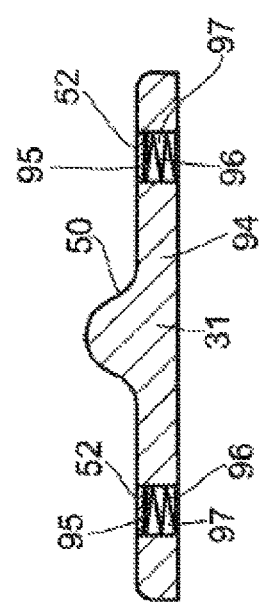
Fig. 7
Fig. 8

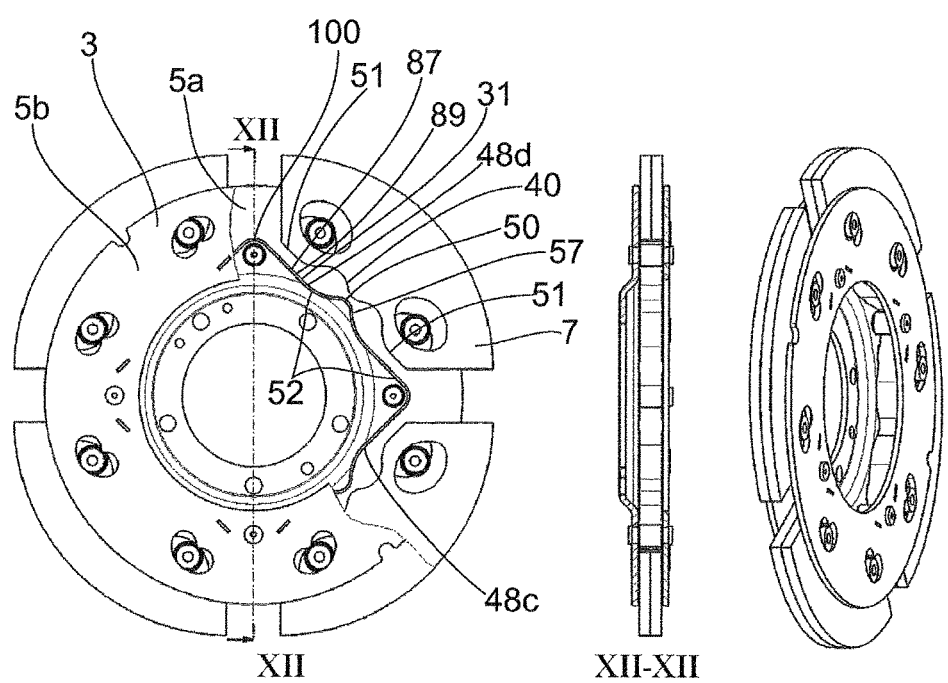
Fig. 12
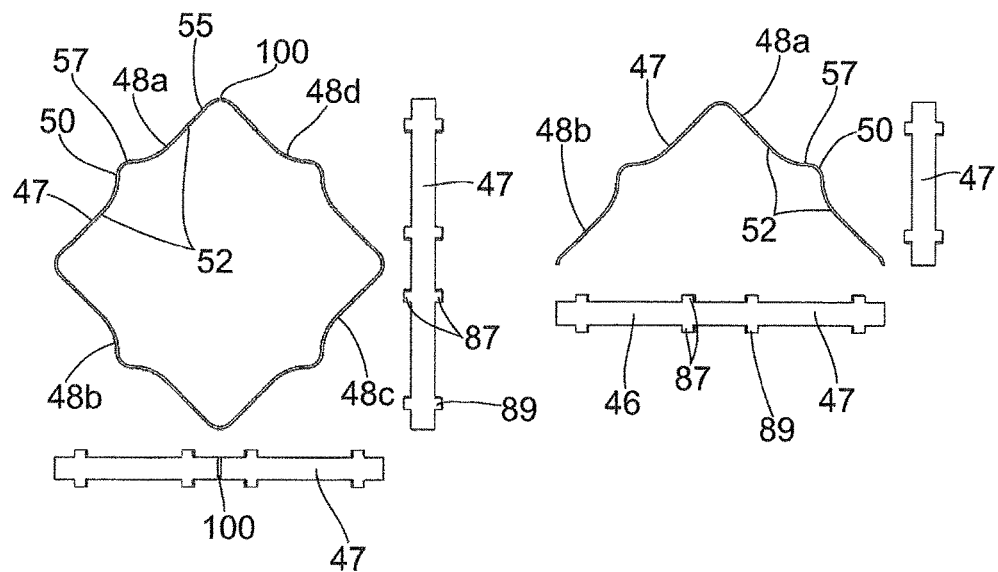
Fig. 13
Fig. 14

VIBRATION ABSORBER SYSTEM

CROSS REFERENCE TO RELATED APPLICATIONS

This is a U.S. national stage of application No. PCT/EP2014/066300, filed on Jul. 29, 2014. Priority is claimed on German Application No.: DE102013217089.0, Filed Aug. 28, 2013, the content of which is incorporated herein by reference.

BACKGROUND OF THE INVENTION

1. Field of the Invention

The present invention is directed to a mass damper system with a damper mass carrier at which is received at least one damper mass movable relative to the damper mass carrier and at least one stop. The damper mass moves within a predetermined movement region at least during an operating state in which a rotational movement of the damper mass carrier around a central axis has exceeded a predetermined limit speed.

2. Detailed Description of the Prior Art

A mass damper system of the type mentioned above is known from DE 10 2009 042 818 A1. The mass damper system has in the radially inner region an annular component part which, like a hub disk serving as damper mass carrier, is secured to an output-side flywheel mass of the mass damper system. As can be seen particularly in FIG. 5 of DE 10 2009 042 818, the hub disk serves to receive a plurality of damper masses arranged successively in circumferential direction and, to this end, has two guide paths for each damper mass, these two guide paths being connected in each instance to two guide paths of the respective damper mass via a rolling body. In this way, the damper masses are displaceable in each instance in circumferential direction relative to the hub disk until coming in contact by radial extensions with a flexible stop associated with the respective movement direction. According to the construction in FIG. 1 of DE 10 2009 092 818, the flexible stop is provided at the annular component part.

In driving operation, i.e., in an operating state in which the rotational movement of the mass damper system—and, therefore, of the damper mass carrier—around a central axis has exceeded a predetermined limit speed, the damper masses remain inside a movement region bounded at one end by an initial position in which the damper masses are free from a deflection in circumferential direction and, at the other end, by a limit position in which the damper masses have undergone a deflection of a predetermined deflection distance in circumferential direction. While the damper masses operate sufficiently noiselessly in driving mode, the rotational movement of the mass damper system and, therefore, of the damper mass carrier around the central axis drops below the predetermined limit speed in other operating states, e.g., when turning off the corresponding drive such as an internal combustion engine, or in creep mode of the corresponding vehicle, and the centrifugal force acting on the damper masses accordingly decreases. As soon as the centrifugal force has dropped below the weight force, the damper masses drop down and generate an unacceptable impact noise in their paths and/or at the stops.

SUMMARY OF THE INVENTION

It is an object of one aspect of the invention to construct a mass damper system provided with damper masses such that impact noise can be actively prevented during extreme deflections of the damper masses in driving mode and during operating phases other than the driving mode.

In accordance with one embodiment of the present invention, a mass damper system is provided with a damper mass carrier at which is received at least one damper mass movable relative to the damper mass carrier and with at least one stop, wherein the damper mass moves within a predetermined movement region at least during an operating state in which a rotational movement of the damper mass carrier around a central axis has exceeded a predetermined limit speed.

In this respect, it is significant that the predetermined movement region has at least two movement region portions, a first movement region portion being bounded at one end by an initial position in which the damper masses are free from a deflection in circumferential direction and, at the other end, by a limit position in which the damper mass has undergone a deflection of a predetermined deflection distance in circumferential direction, while a second movement region portion is defined at one end by the limit position and at the other end by a stop position in which the damper mass has come in contact with the stop. At least at a stop side facing the at least one stop, the at least one damper mass has a proximity profile which is shaped corresponding to a stop profile of the stop such that in the first movement region portion the damper mass remains within a residual distance region relative to the stop at least in at least one extension portion of the proximity profile in which this proximity profile comes closest to the stop profile of the stop, and in the second movement region portion at at least two impingement positions of the proximity profile which are provided so as to be circumferentially offset with respect to one another the damper mass comes in contact with at least two supporting positions of the stop which are provided so as to be circumferentially offset with respect to one another.

The first movement region portion is utilized in driving mode under normal operating conditions in which torsional vibrations superposed on a torque initiate deflections of the damper masses from their initial position but do not force the damper masses to deflect beyond the limit position. Under these operating conditions, the damper mass would move very closely, preferably measured by gap width, along the associated stop without contacting it, since the radial distance between the proximity profile of the respective damper mass and the stop profile of the stop remains within a residual distance region relative to the stop at least in at least one extension portion in which the proximity profile comes closest to the stop profile of the stop. However, apart from this, there are also operating states in which the rotational movement of the mass damper system and, therefore, of the damper mass carrier around the central axis decreases below the predetermined limit speed and, therefore, the centrifugal force acting on the damper masses falls below the weight force. As soon as the centrifugal force has fallen below the weight force, the damper masses no longer tend radially outward, but rather tend to fall downward (inward) owing to the weight force. This is the case, for example, when the corresponding drive such as an internal combustion engine is turned off or during creep operation of the corresponding vehicle. In an operating state such as this, the damper masses exit the permissible movement region but, because the proximity profiles have a radial distance from the associated stop profiles which lies within the residual distance region and which is therefore short, the damper masses can only build up a slight speed before coming to a standstill with their stop profile at the associated stop. Because of the resulting short "dropping height", a momentum of the damper masses remains limited when impinging on the associated stops, which can have a positive effect on possible impact noises.

On the other hand, when very adverse vibration conditions occur in driving mode, it cannot be ruled out that the damper masses will pass into the second movement region portion. As soon as the radial distance which exists between the proximity profiles of the damper masses and the stop profile at the associated stop and which lies within the residual distance region is used up, the proximity profiles of the damper masses come in contact with the stop profile of the associated stop at least in two extension portions which are arranged so as to be circumferentially offset with respect to one another. In these at least two extension portions which are arranged so as to be circumferentially offset with respect to one another, the proximity profile of the respective damper mass has impingement positions which come in contact with associated supporting positions of the stop profile of the stop. The supporting positions of the stop profile are also provided with a circumferential offset with respect to one another. As a result of this special kind of operative connection between the damper masses and the stop, a swiveling movement of the respective damper mass around its center of rotation is reliably prevented also at the end of its deflection path.

As has already been stated, the solution implemented at the damper masses and stops ensures even under adverse operating conditions that there is only limited momentum when the damper masses impinge on associated stops due to short drop heights of the damper masses. Possible impact noises are limited further still in that the at least one stop is elastically deformable at least in its supporting positions. The aim of this step consists in that whenever a damper mass impinges on the associated stop and accordingly exerts a force with at least one component acting in direction of the stop, a deformation is initiated at the stop, specifically in particular in that region of the stop in which the damper mass has impinged, i.e., therefore, preferably in regions in which the supporting positions of the proximity profile are provided. As force is introduced through the corresponding damper mass, at least the deformed region of the respective stop builds up an oppositely directed force, hereinafter referred to as counterforce. The movement of the respective damper mass decreases due to the deformation at the stop until an equilibrium state is achieved between force and counterforce. Accordingly, the stops have a damping action with respect to the impact momentum of the damper masses.

Depending on the configuration of the impingement positions at the proximity profile of the respective damper mass in relation to the supporting positions at the stop profile of the respective stop and depending on the relative arrangement of the damper masses with respect to the associated stops, the deflection angle of the damper masses with respect to the damper mass carrier up to which the damper masses execute their relative deflecting movement with respect to the damper mass carrier without damping and after which the relative deflecting movement of the damper masses with respect to the damper mass carrier is increasingly damped is fixed in that the impingement positions of the proximity profile of the damper masses act with increasing radial force component on the corresponding supporting positions at the stop profile of the respective stop until the damper masses come to a stop as the above-mentioned equilibrium state between force and counterforce is reached.

It is ensured that the operative connection between the damper masses and the respective associated stop is initiated in a gentle manner in that a continuous path is formed between the impingement positions and the rest of the extension regions of the respective proximity profile on the one hand and in that a continuous path is formed between the supporting positions and the rest of the extension regions of the respective stop profile on the other hand.

In order to ensure the elastic deformability, the respective stop is preferably formed, at least in the extension regions of the supporting positions of its stop profile, as a spring device formed by at least one spring element but, alternatively, also by a plurality of spring elements. In a particularly advantageous manner, these spring elements are formed in in the manner of a leaf spring and, also in a particularly advantageous manner, extend in circumferential direction with respect to spacer pieces. When the damper mass carrier is constructed with two damper mass support elements arranged parallel to one another in axial direction, these spacer pieces fixedly connect the two damper mass support elements to one another. The spring elements are preferably fastened to the damper mass carrier, for example, at at least one damper mass support element, and either extend in circumferential direction far enough that their circumferential ends are guided beyond respective associated spacer pieces, or the spring elements are arranged in Circumferential direction between every two spacer pieces. In case of the former, when the spacer pieces are arranged at the side of the spring elements remote of the damper masses, the special advantage consists in that the spring elements—insofar as they are spaced apart from the spacer pieces, e.g., by the width of a gap, in unloaded condition—close the gap while moving increasingly toward the corresponding spacer piece as soon as the damper masses have impinged on the spring elements and act upon the latter with increasing radial force component as the relative deflecting movement of the damper masses progresses in deflecting direction, so that the spring elements are finally supported at this spacer piece against the radial force component transmitted by the damper mass. A construction of this kind is particularly advantageous when the fastening locations of the respective spring element are provided so as to be spaced apart at the circumferential side from the supporting positions of the stop profile.

When the spring elements are arranged such that they are provided between two adjacent spacer pieces in circumferential direction or their circumference-side ends are guided out past the respective associated spacer pieces, it has proven useful to provide at least two fastening locations to the damper mass carrier along the extension length of the respective spring element so that this spring element is received in such a way that it is secured against rotation relative to a central axis of the mass damper system. On the other hand, if the length of the spring elements is greater in circumferential direction because they extend along at least three adjacent spacer pieces, it is possible to reduce the quantity of fastening locations along the extension length of the spring element. However, even when a spring element extends along an angle of 360° in circumferential direction, fastening locations are still required as long as this spring element has at least one interruption location in circumferential direction, although the quantity of these fastening locations is appreciably reduced compared to a construction in which one spring element is associated with every two spacer pieces. On the other hand, if an interruption location is omitted in case of a spring element extending along an angle of 360° in circumferential direction, the spring element can be positioned solely by spacer pieces. Additional fastening locations are then not absolutely required.

BRIEF DESCRIPTION OF THE DRAWINGS

The invention will be described in more detail in the following with reference to the accompanying drawings. In the drawings:

FIG. 1 is a top view of a mass damper system with damper masses and associated stops formed by spring elements of a spring device, wherein the damper masses are shown in an initial position occupied by the damper masses when centrifugal force exceeds weight force and without transmitted torsional vibrations;

FIG. 2 is a sectional view of the mass damper system along section line II-II in FIG. 1;

FIG. 3 is a detail of a spring element of the spring device shown in FIG. 1;

FIG. 4 is a cut-out view inside a damper mass support element with a recess serving to fasten the spring element of the spring device shown in FIG. 1;

FIG. 5 is similar to FIG. 4, but with a view of a diverging construction of the spring element of the spring device;

FIG. 6 is similar to FIG. 5, but with a view of a diverging construction of the recess;

FIG. 7a-7c are similar to FIG. 1, but with the damper masses in different deflection positions within a movement region;

FIG. 8 is a sectional view through a stop which differs from the stop shown in FIG. 1;

FIG. 12 is similar to FIG. 1, but with a view of a diverging construction of the spring device of the stop;

FIG. 13 is a detail of the spring device shown in FIG. 12;

FIG. 14 is a detail of another embodiment form of the spring device shown in FIG. 13;

DETAILED DESCRIPTION OF THE PRESENTLY PREFERRED EMBODIMENTS

Figure 9:
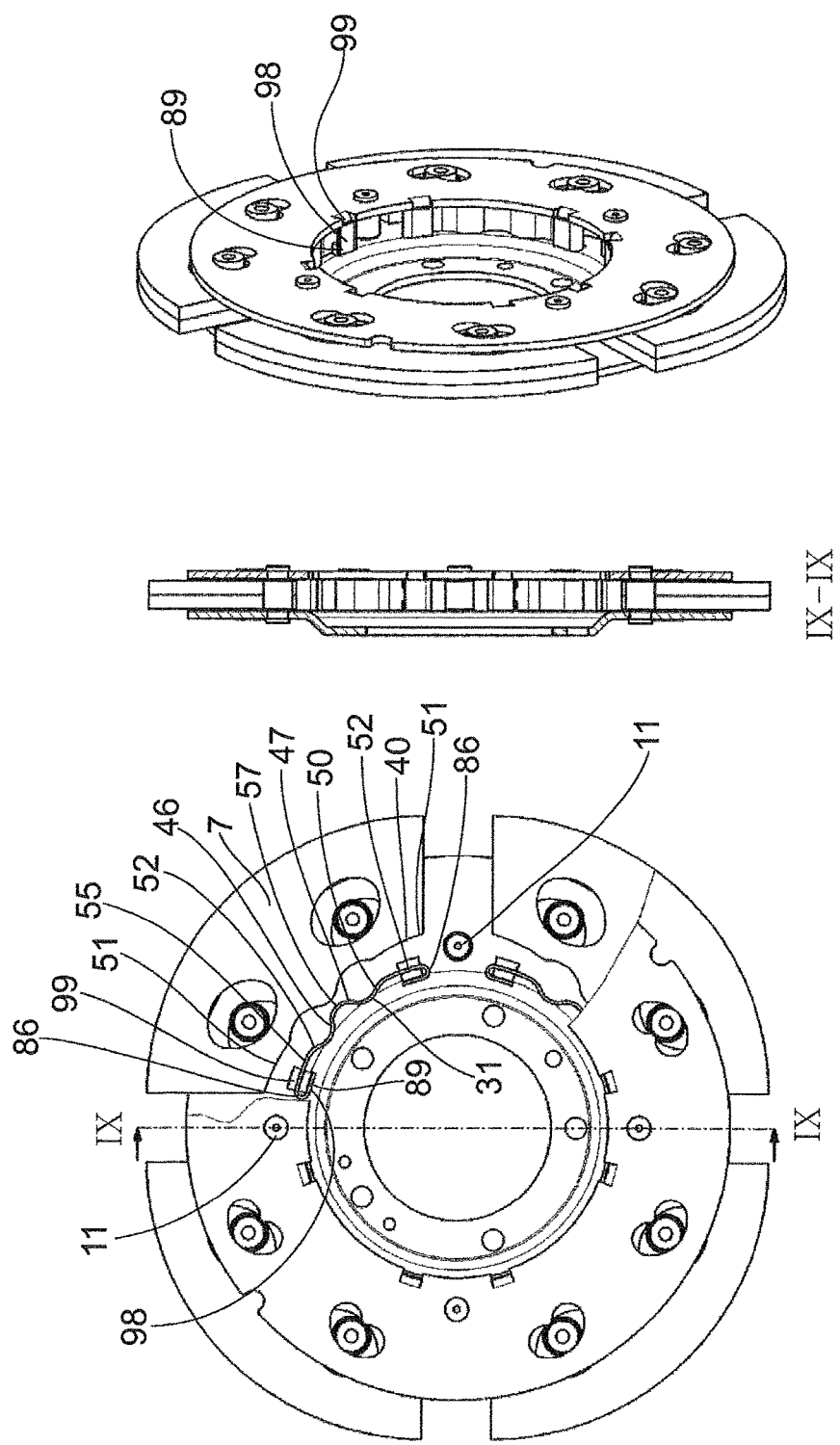
FIG. 9 is similar to FIG. 1, but with a view of a diverging construction of the spring element of the spring device of the stop.

FIG. 1 shows a mass damper system 1 with a damper mass carrier 3 that has two axially spaced damper mass support elements 5a, 5b, of which only the damper mass support element 5b arranged axially in front of the damper masses 7 in viewing direction is shown for the sake of a clearer illustration of the subject matter of the invention. The two damper mass support elements 5a, 5b are connected to one another by spacer pieces 11. The two damper mass support elements 5a, 5b and spacer pieces 11 are shown in FIG. 2, which is a view along section line II-II in FIG. 1. FIG. 2 also conveys particulars about the damper masses 7, which have a plurality of damper mass elements 44a, 44b in axial direction. The circumferential sides 42 on both sides of the damper masses 7 adjoin a radially inner stop side 43. The stop side 43 of the respective damper mass 7 is profiled and has in the area of a damper mass center 35 a radial projection 57 adjoined at both sides in circumferential direction by a radial indentation 58 which in turn passes again in circumferential direction into a further radial projection 57. Accordingly, these radial projections 57 are provided adjoining the circumferential sides 42 of the respective damper mass 7. The individual radial projections 57 and radial indentations 58 merge into one another in each instance by an at least substantially continuous path.

As is shown in FIG. 1, the damper masses 7 are arranged over rolling bodies 20 inside of guide paths 22 provided in each instance in the damper mass support elements 5a, 5b. The guide paths 13 have narrowed portions 12 in each instance so that a radial relative movement of the rolling bodies 20 with respect to the damper mass support elements 5a, 5b is prevented at least to a great extent. In contrast, the rolling bodies 20 extend with a radial clearance 23 into the guide paths 22 provided in the damper masses 7. This radial clearance 23 ensures a slight relative movability of the damper masses 7 relative to the rolling bodies 20 and, therefore, relative to the damper mass carrier 3. The guide paths 13 formed at the damper mass carrier 3 are provided, with respect to the relevant damper mass 7, in pairs on both sides of the damper mass center 35 of this damper mass 7 and extend in a curved manner, in each instance with an initial region 14 in which the respective guide path 13 has the greatest radial distance from a central axis 15 and with connection regions 17, which extend circumferentially opposite one another so as to adjoin at both sides of the initial region 14. The guide paths 22 provided at the damper masses 7 also extend in a curved manner, in each instance with an initial region 24 in which the respective guide path 22 has the greatest radial distance from the central axis 15, and with connection regions 25 which extend circumferentially opposite one another so as to adjoin at both sides of the initial region 24.

Each of the rolling bodies 20 received in the guide paths 13, 22 engages in each instance in two guide paths 13 provided on both sides of the respective guide path 22. In the diagram shown in FIG. 1, the damper masses 7 tend radially outward under centrifugal force so that the rolling bodies 20 position themselves in each instance in the initial region 24 of the respective guide path 22. In this regard, the rolling bodies 20 are supported in each instance in the initial region 14 of the damper mass support elements 5a, 5b.

A spring device 47, specifically a spring element 46 formed in the manner of a leaf spring, is provided radially inside of every damper mass 7. As can be seen clearly from a detail of the spring element 46 in FIG. 3, this spring element 46 has transverse projections 87 at circumferential distances from the respective circumferential ends 86. These transverse projections 87 either extend with clearance in circumferential direction or without clearance into recesses 88 that are provided for this purpose in the damper mass support elements 5a, 5b of the damper mass carrier 3 as is shown in FIG. 4. Therefore, the transverse projections 87 serve as fastenings 89 for the respective spring element 46.

According to FIG. 5, the spring device 47 provided radially inside of the respective damper mass 7 can be constructed differently. Accordingly, the spring element 46 shown in FIG. 5 has eyelets 90 at circumferential distances from the respective circumferential ends 86 and engage around a stud 91 in each instance. Each of these studs 91 engages—either with clearance in circumferential direction or without clearance—in correspondingly shaped recesses 88 which, as is shown in FIG. 6, are provided for this purpose in the damper mass support elements 5a, 5b of the damper mass carrier 3. The eyelets 90 accordingly serve in combination with the studs 91 as fastenings 89 for the respective spring element 46.

Referring again to FIG. 1, it can be seen that the circumferential ends 86 of each respective spring element 46 are guided in circumferential direction over the respective associated spacer piece 11 such that a distance remains between the spring element 46 and the spacer piece in the width of a gap 92. There is also a distance in the width of a gap 93 between the respective circumferential end 86 of one of the spring elements 46 and the respective circumferential end 86 of the adjacent spring element 46.

The respective spring element 46 has at its side facing the corresponding damper mass 7, approximately in the center in circumferential direction, a radial bulge 49, which passes into radial flattened portions 55 on both sides of the radial bulge 49 circumferentially along an at least substantially continuous path. Accordingly, the radial outside of the spring element 46 facing the damper masses 7 is formed in a profiled manner. The stop side 43 of the respective damper mass 7 acts as a proximity profile 40 with respect to the radial outer side of the spring element 46, while the radial outer side of the spring element 46 serves as stop profile 50 with respect to the stop side 43 of the respective damper mass 7. The function of these profiles 40, 50 will be described in detail in the following.

When the mass damper system 1 is operated in driving mode at a speed at which the centrifugal force exceeds the weight force, the damper masses 7 move radially outward under centrifugal force so that the rolling bodies 20 can position themselves in the initial region 24 of the respective guide path 22 of the damper masses 7 in each instance and can be supported in the initial region 14 of the respective guide paths 13 of the damper mass support elements 5a, 5b. This state is also illustrated in FIG. 7a as well as in FIG. 1. It should be noted here that there still remains radially between the circumferentially central radial projection 57 of the respective damper mass 7 and the radial bulge 49 of the spring element 46 located radially opposite thereto a radial distance lying within a predetermined residual distance region 45. This residual distance region 45 is kept very small and, ideally, is reduced to gap width. In a particularly preferable manner, the residual distance region 45 is on an order of magnitude of a few millimeters, ideally on the order of between 1 and 1.5 mm. Particularly good results have been achieved with a residual distance region 45 on the order of approximately 1.2 mm.

Since torsional vibrations are generally superposed on a transmitted torque, the damper masses 7 are compelled to deflect in circumferential direction so that the rolling bodies 20 are deflected out of the initial regions 24 of the guide paths 22 into the connection regions 25 thereof and from initial regions 14 of guide paths 13 into connection regions 17 thereof. Insofar as the damper masses 7 remain during this deflection movement within a first movement region portion of the total movement region in which they are not deflected beyond a predetermined limit position, there is always a radial distance between the respective damper mass 7 and the spring element 46, which radial distance lies within the residual distance region 45, as can be seen from FIG. 7b. This applies in particular for at least one extension portion of the proximity profile 40 by which the proximity profile 40 comes closest to the stop profile 50 of the spring element 46.

The limit position for the damper masses 7, and, therefore, the extent of the first movement region portion, preferably lies in a deflection angle range of up to about 48°. Referring to FIG. 7b, the extent of deflection of the damper masses 7 from the respective initial region is about 25°. The damper masses 7 are always restored to the initial position under centrifugal force as the torsional vibration decays.

Keeping the radial distance between the respective damper mass 7 and the spring element 46 within the residual distance region 45 until reaching the limit position for the damper masses 7 in the deflection angle range of up to about 48° makes sense for the following reason: when the centrifugal force drops below the weight force, for example, in creep mode of a motor vehicle or when stopping a drive, e.g., an internal combustion engine, the damper masses 7 drop until at least a portion of the damper masses 7 has reached the associated spring element 46 and accordingly comes to a stop. Regardless of whether a portion of the damper masses 7 arrives in contact with the respective spring element 46 indirectly via another damper mass 7 or whether all of the damper masses 7 arrive directly in contact with the spring elements 46, the distance to be overcome is at most on the order of the residual distance region 45. Owing to this extremely small distance, the dropping damper masses 7 can only build up a limited velocity. Accordingly, the momentum when impinging on the spring elements 46 or on the adjacent damper mass 7 remains small and generates a correspondingly slight impact noise.

The situation becomes still more favorable as a result of the elastic behavior of the spring element 46. Whenever a damper mass 7 impinges on the associated spring element 46 and accordingly exerts a force with at least one component acting in the direction of the spring element 46, a deformation is initiated at the spring element 46, specifically, particularly in that region of the spring element 46 in which the respective damper mass 7 has impinged, i.e., therefore, preferably in the extension regions of the circumferential ends 86 of the spring elements 46 and, therefore, in regions in which the supporting positions 52 of the proximity profile 40 are provided. As a result of the deformation, the corresponding extension regions of the spring element 46 move closer to the respective associated spacer piece 11 while closing the gap 92 between the spring element 46 and this spacer piece 11. As force is transmitted by the corresponding damper mass 7, at least the deformed extension region of the respective spring element 46 builds up an oppositely directed force, referred to hereinafter as counterforce. The movement of the respective damper mass 7 decreases through the deformation at the spring element 46 until an equilibrium state is reached between force and counterforce. If this equilibrium state between force and counterforce does not occur as long as a residual fraction of the gap 92 still remains, the respective deformed extension region of the spring element 46 comes in contact with the associated spacer piece 11 and is accordingly supported at this spacer piece 11.

The spring elements 46 have a damping effect with respect to the impact momentum of the damper masses 7. This substantial advantage notwithstanding, it can be stated unequivocally that the spring elements 46 act as a stop 31 with respect to the respective associated damper mass 7.

When torque with even stronger torsional vibrations is introduced, the state shown in FIG. 7c is reached. In this state, the damper masses 7 are strongly deflected in circumferential direction such that they pass into a second movement region portion of the total movement region. In this second movement region portion, the damper masses 7 are deflected beyond the predetermined limit position, i.e., into an angular region above about 48° proceeding from the initial region. As soon as the radial distance between the proximity profile 40 of the damper mass 7 and the stop profile 50 of the spring element 46 within the residual distance region 45 is used up, impingement positions 51 of the proximity profile 40 of the respective damper mass 7 come in contact with supporting positions 52 of the stop profile 50 in this second movement region portion. A first impingement position 51 of the proximity profile 40 is located at that radial projection 57 of the damper mass 7 that is located at the front end thereof in deflecting direction. A second impingement position 51 of the proximity profile 40 is located at the radial projection 57 of the damper mass 7 that is located at the rear end thereof in deflecting direction. The radial projection 57 of the first impingement position 51 cooperates with the associated radial flattened portion 55 serving as first supporting position 52 at the stop profile 50 of the spring element 46, while a second supporting position 52 of the stop profile 50 is provided in circumferential direction between the radial bulge 49 and the radial flattened portion 55 located behind this radial bulge 49 in deflecting direction of the damper mass 7.

As soon as the impingement positions 51 of the proximity profile 40 of the respective damper mass 7 have impinged on the associated supporting positions 52 of the stop profile 50 of the spring element 46, the deflecting movement of the damper masses 7 in deflecting direction is increasingly damped until finally coming to a stop, namely, before the circumferential ends 86 of the damper masses 7 come in contact with one another and/or the rolling bodies 20 come in contact with the guide paths 13 or 22 accompanied by impact noise. Due to the support of the respective damper mass 7 via at least two impingement positions 51 of the proximity profile 40 at two supporting positions 52 of the stop profile 50, a broad positioning of the damper masses 7 in circumferential direction is achieved so that an exactly defined orientation can be achieved without unwanted swiveling around the respective damper mass center 35. The impingement of the impingement positions 51 of the proximity profile 40 of the respective damper mass 7 on the associated supporting positions 52 of the stop profile 50 of the spring element 46 takes place in the manner already described, this impingement being accompanied by a deformation of the respective extension region in the direction of the associated spacer piece 11 until either an equilibrium state has been established between the force transmitted by the damper mass 7 and the counterforce generated by the spring element 46 or the spring element 46 has come in contact with the spacer piece 11 after closing the gap 92 relative to the spacer piece 11.

Whereas the description up to this point has addressed only a spring device 47 with spring elements 46 as stop 31, another conceivable stop 31 uses elements 94 as a substitute for the spring elements 46. Elements 94 have substantially rigidly formed extension regions and are elastically deformable only at those locations at which impingement positions 51 of the proximity profile 40 of the respective damper mass 7 are to come in contact. Consequently, these locations are supporting positions 52 of the stop profile 50 of the respective stop 31. The elasticity can be achieved, for example, through inserts 95 which are provided in recesses 97 of the respective element 94 and which are supported, respectively, at a spring 96 received in the respective recess 97. FIG. 8 schematically shows a stop 31 of this kind.

Figure 10:
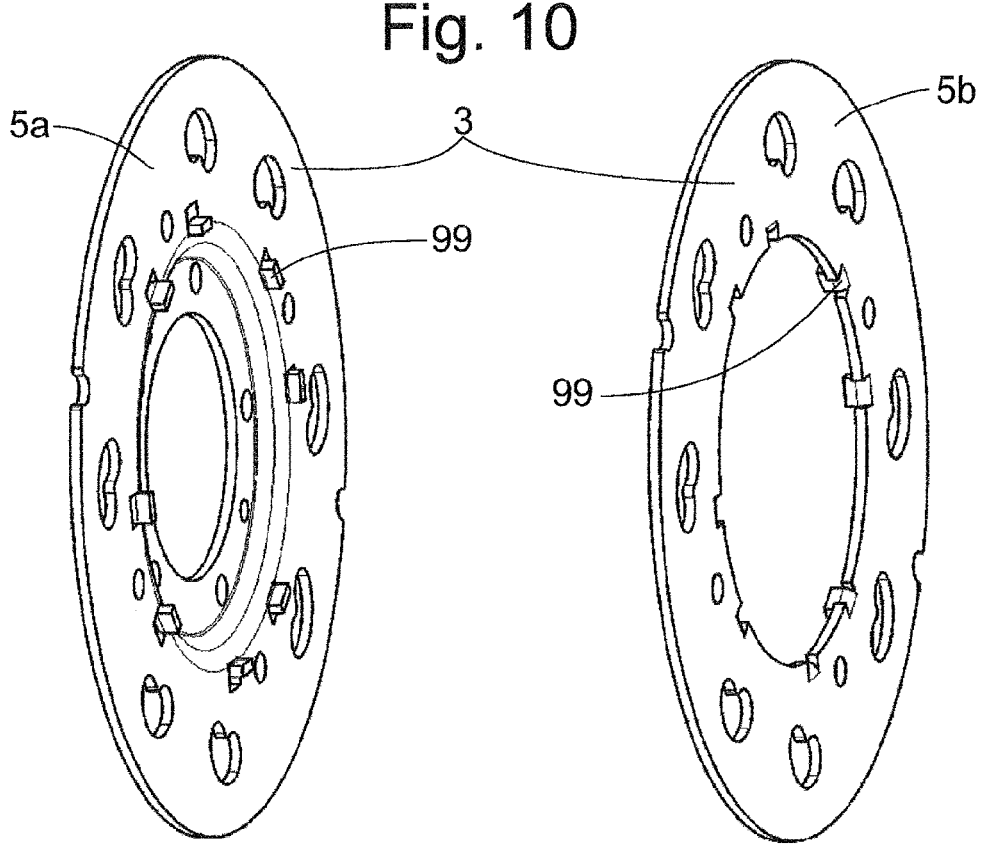
FIG. 10 is a detail from the damper mass support elements shown in FIG. 9 with fastenings for the spring elements of the spring device.
Figure 11:
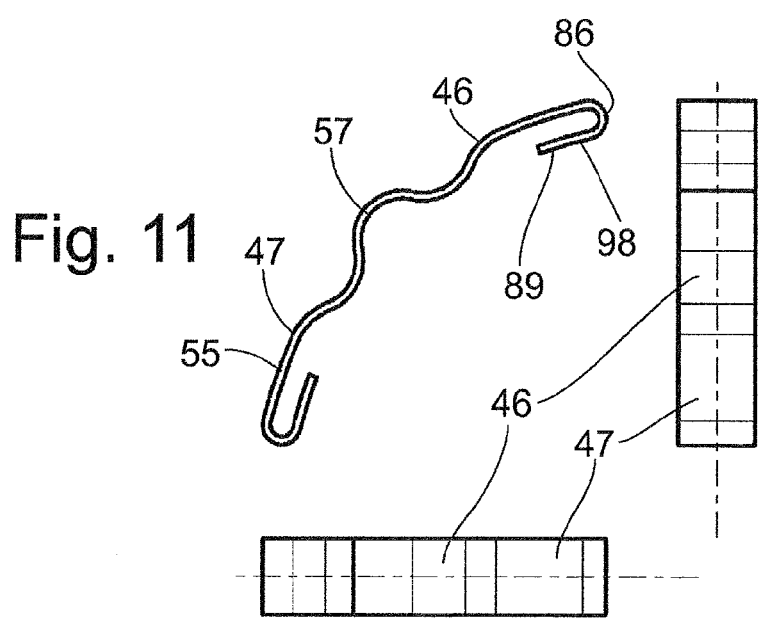
FIG. 11 is a detail of the spring elements of the spring device shown in FIG. 9.

FIGS. 9 to 11 show a construction that deviates from the previous construction but functions on the same operating principle. In this construction, the spring device 47 is formed by spring elements 46, which are constructed in the manner of leaf springs but received between every two spacer pieces 11 in circumferential direction. The spring elements 46 have at their circumferential ends 86 bent portions 98 that serve to engage around tabs 99 provided on at least one of the damper mass support elements 5a, 5b of the damper mass carrier 3 and accordingly form fastenings 89 for the respective spring element 46. As can be seen particularly from FIG. 10, the tabs 99 are generated by bending in axial direction after being cut free from the respective damper mass support element 5a, 5b. Further, FIG. 9 clearly shows that the respective spring element 46 is provided with a stop profile 50 at its side facing the associated damper mass 7, which stop profile 50 has a radial projection 57 and—on both sides thereof in circumferential direction—radial flattened portions 55 and therefore provides supporting positions 52 with which the impingement positions 51 of the proximity profile 40 of the respective damper mass 7 can come in contact in the manner already described. Accordingly, the spring elements 46 of the spring device 47 also act as stop 31 for the damper masses 7 in this construction.

FIGS. 12 and 13 show a further construction in which the spring device 47 is formed by four leaf spring-like spring element segments 48a to 48d. While all four of the spring element segments 48a to 48d are connected to one another, a gap 100 remains between spring element segments 48a and 48d so that spring element segments 48a and 48d are not connected to one another directly, but rather only indirectly via spring element segments 48b and 48c which are located therebetween in circumferential direction. As in the construction already shown in FIGS. 1 to 4, there are provided at the spring element segments 48a to 48d transverse projections 87 that engage in corresponding recesses 88 (see FIG. 5). These transverse projections 87 form fastenings 89 for connecting the spring element segments 48a to 48d to the damper mass carrier elements 5a, 5b and, therefore, for connecting the spring device 47 to the damper mass carrier 3. An advantage of the spring device 47 with the leaf spring-like spring element segments 48a to 48d over the solution shown in FIGS. 1 to 4 with four individual spring elements 46 can consist in the smaller quantity of fastenings 89 and in the smaller quantity of individual components so that manufacture is simplified. The same advantages can be achieved with the solution according to FIG. 14 in which the spring device 47 is formed by two leaf spring-like spring element segments 48a and 48b such that ultimately only two spring devices 47 are needed for the mass damper system 1.

The spring element segments 48a to 48d in the construction according to FIGS. 12 and 13 as well as the spring element segments 48a and 48b in the construction according to FIG. 14 have in each instance at their side facing the associated damper mass 7 a stop profile 50 which has a radial projection 57 and, on both sides thereof in circumferential direction, radial flattened portions 55 and accordingly provide supporting positions 52 by which they can come into contact in the manner already described with the impingement positions 51 of the proximity profiles 40 of the respective damper mass 7. Of course, in these constructions spring element segments 48a to 48d or spring element segments 48a and 48b of the respective spring device 47 can act as stops 31 for the respective damper masses 7.

Figure 15:
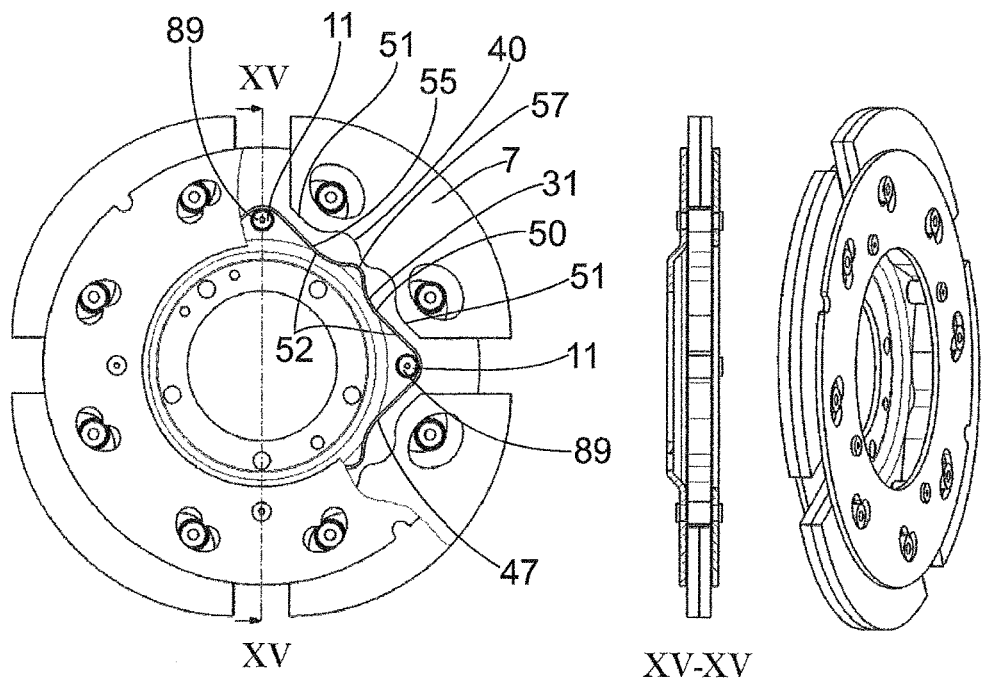
FIG. 15 is similar to FIG. 1, but with view of another diverging construction of the spring device of the stop.
Figure 16:
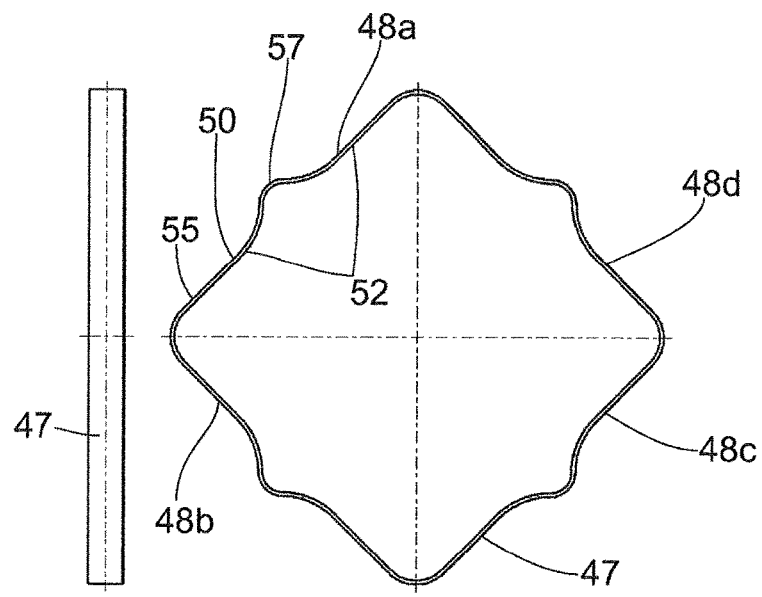
FIG. 16 is a detail of the spring device shown in FIG. 15.

FIGS. 15 and 16 show a construction which is noticeably similar to the construction shown in FIGS. 12 and 13. The difference consists in that the spring device 47, which is again formed by four leaf spring-like spring element segments 48a to 48d, is formed without a gap between its four spring element segments 48a to 48d. Consequently, all four spring element segments 48a to 48d are connected to one another. In a constructional solution of this type, the spring device 47 can be pushed onto the spacer pieces 11 directly and fixed by the latter such that the spacer pieces 11 act as fastening 89 for the spring device 47. Therefore, the transverse projections 87 shown in FIGS. 12 and 13 can be omitted. The advantage of simplified manufacture is further heightened by this step. However, at least some of the four leaf spring-like spring element segments 48a to 48d of the spring device 47 in this construction can also, of course, be provided additionally with transverse projections as is indicated by way of example in FIG. 13 by reference numeral 87.

Also in the construction according to FIGS. 15 and 16, the spring element segments 48a to 48d have in each instance at their side facing the associated damper mass 7 a stop profile 50 which has a radial projection 57 and, on both sides thereof in circumferential direction, radial flattened portions 55 and accordingly provide supporting positions 52 by which they can come in contact in the manner already described with the impingement positions 51 of the proximity profiles 40 of the respective damper mass 7. In this construction the spring element segments 48a to 48d of the spring device 47 again act as stops 31 for the respective damper masses 7.

Figure 17:
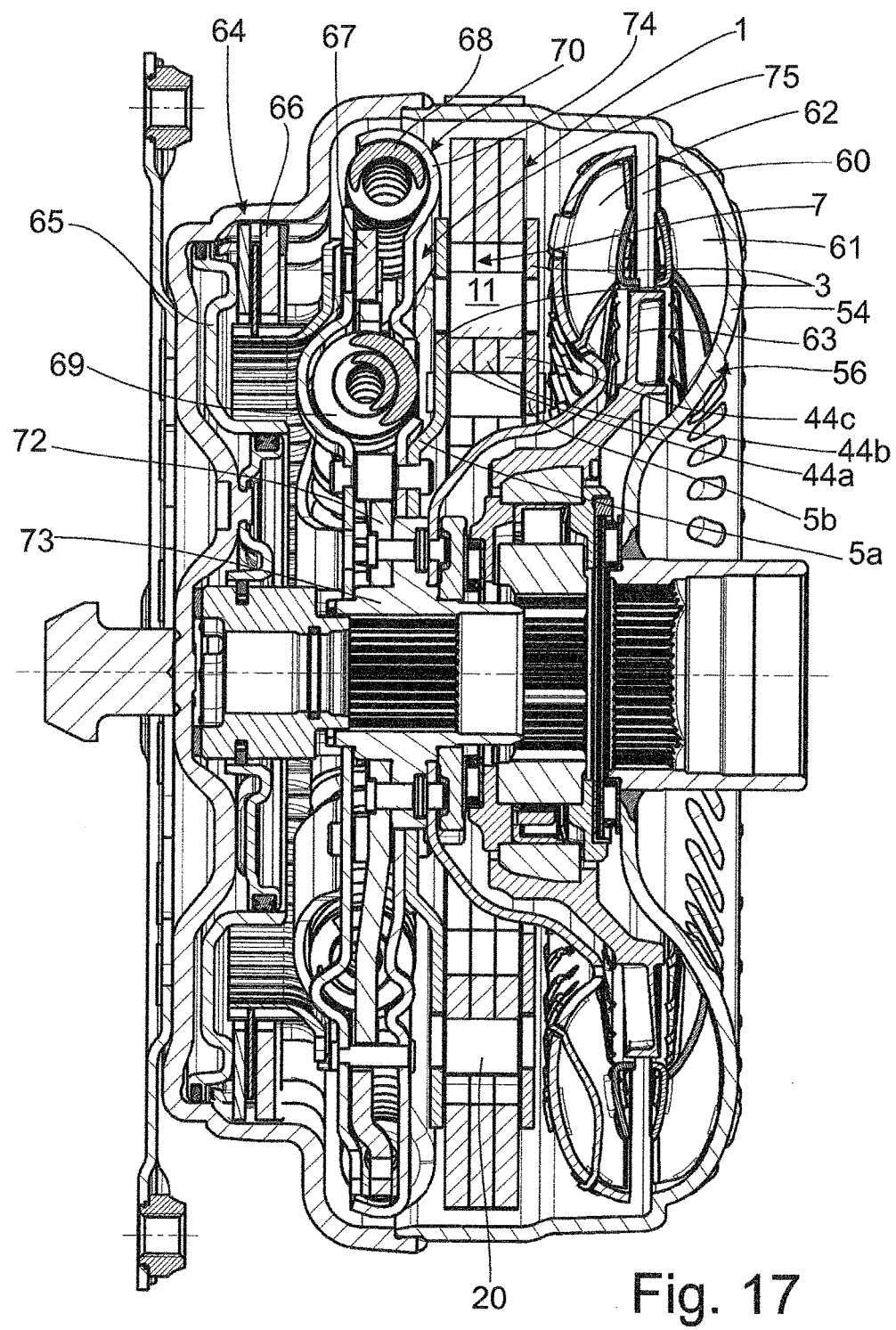
FIG. 17 is a view of the mass damper system at a torsional vibration damper in a hydrodynamic coupling arrangement.

FIG. 17 shows an installation situation for the mass damper system 1 according to the invention. Accordingly, the mass damper system 1 is part of a torsional vibration damper 30 which is provided in the housing 54 of a hydrodynamic coupling arrangement 56. This hydrodynamic coupling arrangement 56 has a hydrodynamic circuit 60 with impeller 61, turbine 62 and stator 63 and a clutch mechanism 64 having a clutch piston 65 and a friction disk clutch 66. Depending on the actuation of the clutch piston 65, the clutch mechanism 64 is movable between an engaged position and a disengaged position. The clutch mechanism 64 is connected to a torsion damper input 67 of a damping device 70 having two circumferential spring sets 68, 69, and the torsion damper output 72 of the damping device 70 cooperates with an output 73. An intermediate torsion damper component 74 at which a damper mass support element 5 of the damper mass carrier 3 of the mass damper system 1 is received so as to be fixed with respect to relative rotation is operative between the two circumferential spring sets 68, 69. Together with the mass damper system 1, the damping device 70 forms the torsional vibration damper 30.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mass damper system comprising:
a damper mass carrier;
at least one damper mass received at the damper mass carrier and movable relative to the damper mass carrier; and
at least one stop arranged on the damper mass carrier,
wherein the at least one damper mass moves within a predetermined movement region at least during an operating state in which a rotational movement of the damper mass carrier around a central axis has exceeded a predetermined limit speed;
wherein the predetermined movement region has at least two movement region portions:
a first movement region portion of the at least two movement region portions bounded at a first end by an initial position in which the at least one damper mass is free from a deflection in a circumferential direction and, at a second end, by a limit position in which the at least one damper mass has undergone a deflection of a predetermined deflection distance in the circumferential direction; and
a second movement region portion of the at least two movement region portions is defined at a first end by the limit position and at a second end by a stop position in which the at least one damper mass has come in contact with the at least one stop;
wherein, at least at a stop side facing the at least one stop, the at least one damper mass has a proximity profile shaped to correspond to a stop profile of the at least one stop such that in the first movement region portion the at least one damper mass remains within a residual distance region relative to the at least one stop at least in at least one extension portion of the proximity profile at which this proximity profile comes closest to the stop profile of the at least one stop, and in the second movement region portion at at least two impingement positions of the proximity profile arranged so as to be circumferentially offset with respect to one another, the at least one damper mass comes in contact with at least two supporting positions of the stop profile of the at least one stop arranged so as to be circumferentially offset with respect to one another,
wherein the at least one stop is elastically deformable at least in the at least two supporting positions,
wherein, in order to ensure the elastic deformability, the at least one stop is formed, at least in extension regions of the at least two supporting positions of the stop profile, as a spring device,
wherein the spring device forming the at least one stop has at least one spring element, wherein the at least one spring element is provided between two spacer pieces that are adjacent to one another in the circumferential direction.

2. A mass damper system comprising:
a damper mass carrier;
at least one damper mass received at the damper mass carrier and movable relative to the damper mass carrier; and
at least one stop arranged on the damper mass carrier,
wherein the at least one damper mass moves within a predetermined movement region at least during an operating state in which a rotational movement of the damper mass carrier around a central axis has exceeded a predetermined limit speed;
wherein the predetermined movement region has at least two movement region portions:
a first movement region portion of the at least two movement region portions bounded at a first end by an initial position in which the at least one damper mass is free from a deflection in a circumferential direction and, at a second end, by a limit position in which the at least one damper mass has undergone a deflection of a predetermined deflection distance in the circumferential direction; and a second movement region portion of the at least two movement region portions is defined at a first end by the limit position and at a second end by a stop position in which the at least one damper mass has come in contact with the at least one stop;

wherein, at least at a stop side facing the at least one stop, the at least one damper mass has a proximity profile shaped to correspond to a stop profile of the at least one stop such that in the first movement region portion the at least one damper mass remains within a residual distance region relative to the at least one stop at least in at least one extension portion of the proximity profile at which this proximity profile comes closest to the stop profile of the at least one stop, and in the second movement region portion at at least two impingement positions of the proximity profile arranged so as to be circumferentially offset with respect to one another, the at least one damper mass comes in contact with at least two supporting positions of the stop profile of the at least one stop arranged so as to be circumferentially offset with respect to one another, wherein the at least one stop is elastically deformable at least in the at least two supporting positions, wherein, in order to ensure the elastic deformability, the at least one stop is formed, at least in extension regions of the at least two supporting positions of the stop profile, as a spring device, wherein the spring device forming the at least one stop has at least one spring element, wherein the at least one spring element comprises a plurality of spring element segments, each of the plurality of spring element segments passes into the next respective spring element segment at a spacer piece.

3. A mass damper system comprising:

a damper mass carrier;

at least one damper mass received at the damper mass carrier and movable relative to the damper mass carrier; and at least one stop arranged on the damper mass carrier, wherein the at least one damper mass moves within a predetermined movement region at least during an operating state in which a rotational movement of the damper mass carrier around a central axis has exceeded a predetermined limit speed;

wherein the predetermined movement region has at least two movement region portions:

a first movement region portion of the at least two movement region portions bounded at a first end by an initial position in which the at least one damper mass is free from a deflection in a circumferential direction and, at a second end, by a limit position in which the at least one damper mass has undergone a deflection of a predetermined deflection distance in the circumferential direction; and a second movement region portion of the at least two movement region portions is defined at a first end by the limit position and at a second end by a stop position in which the at least one damper mass has come in contact with the at least one stop;

wherein, at least at a stop side facing the at least one stop, the at least one damper mass has a proximity profile shaped to correspond to a stop profile of the at least one stop such that in the first movement region portion the at least one damper mass remains within a residual distance region relative to the at least one stop at least in at least one extension portion of the proximity profile at which this proximity profile comes closest to the stop profile of the at least one stop, and in the second movement region portion at at least two impingement positions of the proximity profile arranged so as to be circumferentially offset with respect to one another, the at least one damper mass comes in contact with at least two supporting positions of the stop profile of the at least one stop arranged so as to be circumferentially offset with respect to one another, wherein the at least one stop is elastically deformable at least in the at least two supporting positions, wherein, in order to ensure the elastic deformability, the at least one stop is formed, at least in extension regions of the at least two supporting positions of the stop profile, as a spring device, wherein the spring device forming the stop has at least one spring element, wherein the at least one spring element is connected to at least a component part of the damper mass carrier;

fasteners configured to connect the at least one spring element to the damper mass carrier, wherein the fasteners are provided with spacing on a circumferential side relative to respective circumferential ends of the at least one spring element, wherein at least one of the respective circumferential ends of the at least one spring element is guided beyond a respective associated spacer piece in the circumferential direction, wherein the spacer piece is provided in each instance at a side of a respective spring element remote of the at least two supporting positions of the stop profile.

4. The mass damper system according to claim 3, wherein the residual distance region of the proximity profile of the at least one damper mass relative to the at least one stop profile of the stop is a gap width.

5. The mass damper system according to claim 3, wherein a first supporting position of the stop profile of the at least two supporting positions of the stop profile is associated with an impingement position of the proximity profile of the at least two impingement position of the proximity profile, wherein a respective supporting position of the stop profile corresponds to a deflection path of a corresponding impingement position of the proximity profile.

6. The mass damper system according to claim 3, wherein the at least two impingement positions of the proximity profile and the at least two supporting positions of the stop profile traverse the proximity profile or the stop profile by a continuous path.

7. The mass damper system according to claim 3, wherein the fasteners are provided with the spacing on the circumferential side relative to the at least two supporting positions of the stop profile.

8. The mass damper system according to claim 3, wherein the at least one spring element is brought closer to the respective associated spacer piece in a deformation direction, in at least one of the extension regions of the at least two supporting positions of the stop profile and in the extension region of the at least one spring element circumferential ends, to a width of a gap so that the respective associated spacer piece acts as a deflection limit for the circumferential end of the at least one spring element during the deformation of the at least one spring element under a force transmitted through a corresponding damper mass.

9. The mass damper system according to claim 3, wherein the circumferential ends of the at least one spring element are guided beyond at least one additional respective associated spacer piece adjacent to one another in the circumferential direction.

10. The mass damper system according to claim 3, wherein respective associated spacer pieces adjacent to one another in the circumferential direction act as the fasteners for the at least one spring element.

11. The mass damper system according to claim 3, wherein the at least one spring element is a leaf spring.

* * * * *